United States Patent
Ellwein (10) Patent No.: US 9,938,673 B2
(45) Date of Patent: Apr. 10, 2018

(54) SYSTEM AND METHOD FOR CONTROLLING AUGER OF PAVING MACHINE

(71) Applicant: Caterpillar Paving Products Inc., Brooklyn Park, MN (US)

(72) Inventor: Jacob R. Ellwein, Oak Grove, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 16 days.

(21) Appl. No.: 15/046,765

(22) Filed: Feb. 18, 2016

(65) Prior Publication Data

US 2017/0241087 A1    Aug. 24, 2017

(51) Int. Cl.
| | |
|---|---|
| *E01C 19/48* | (2006.01) |
| *E01C 23/01* | (2006.01) |
| *B60R 21/013* | (2006.01) |
| *B60W 30/09* | (2012.01) |
| *E01C 19/00* | (2006.01) |

(52) U.S. Cl.
CPC ............ *E01C 19/48* (2013.01); *B60R 21/013* (2013.01); *B60W 30/09* (2013.01); *E01C 19/00* (2013.01); *E01C 23/01* (2013.01); *B60R 2021/01304* (2013.01)

(58) Field of Classification Search
CPC .......... E01C 19/48; E01C 19/00; E01C 23/01; B60W 30/09; B60R 21/013; B60R 2021/01304
See application file for complete search history.

(56) References Cited

U.S. PATENT DOCUMENTS

| | | | | |
|---|---|---|---|---|
| 4,171,606 | A | | 10/1979 | Ziegler et al. |
| 4,708,519 | A | * | 11/1987 | Davin ..................... E01C 19/42 404/101 |
| 4,933,853 | A | * | 6/1990 | Musil ..................... G01S 15/88 37/382 |
| 5,288,166 | A | * | 2/1994 | Allen ..................... E01C 19/006 404/114 |
| 5,752,783 | A | * | 5/1998 | Malone ................. E01C 19/006 404/104 |
| 6,027,282 | A | * | 2/2000 | Horn ....................... E01C 19/48 404/75 |

(Continued)

FOREIGN PATENT DOCUMENTS

JP            07229301 A   *   8/1995

*Primary Examiner* — Rami Khatib
*Assistant Examiner* — Jeffrey Boomer (57) ABSTRACT

The present disclosure is related to a paving machine including a tractor, a screed assembly coupled to the tractor, and an auger coupled to the tractor and disposed between the tractor and the screed assembly. The paving machine includes an actuator coupled to the auger and the tractor. The actuator is configured to move the auger relative to a ground surface. The paving machine includes a sensor coupled to the tractor and configured to detect an obstruction on the ground surface. The paving machine includes a controller in communication with the actuator and the sensor. The controller is configured to receive a signal from the sensor assembly indicative of the obstruction. The controller is further configured to control the actuator to raise the auger.

11 Claims, 5 Drawing Sheets

(56) References Cited

U.S. PATENT DOCUMENTS

| | | | | |
|---|---|---|---|---|
| 6,152,648 | A * | 11/2000 | Gfroerer | E01C 23/088 299/1.5 |
| 7,172,363 | B2 * | 2/2007 | Olson | E01C 19/48 404/118 |
| 8,894,323 | B2 | 11/2014 | Rutz et al. | |
| 8,979,423 | B2 | 3/2015 | Smieja | |
| 9,045,871 | B2 | 6/2015 | Graham et al. | |
| 9,051,696 | B1 | 6/2015 | Coats et al. | |
| 2003/0108390 | A1 * | 6/2003 | Carlson | E01C 19/405 404/118 |
| 2004/0211092 | A1 * | 10/2004 | Barnes | E02F 3/20 37/142.5 |
| 2006/0198703 | A1 * | 9/2006 | Hall | B28D 1/18 404/94 |
| 2007/0150148 | A1 * | 6/2007 | Rasmussen | E01C 19/004 701/50 |
| 2010/0063691 | A1 * | 3/2010 | Hall | B28D 1/18 701/50 |
| 2010/0192422 | A1 * | 8/2010 | Yamazaki | E01H 5/04 37/257 |
| 2012/0288328 | A1 * | 11/2012 | Minich | E01C 19/1063 404/72 |
| 2013/0223927 | A1 * | 8/2013 | Mings | E01C 19/48 404/72 |
| 2014/0099165 | A1 * | 4/2014 | Smieja | E01C 19/48 404/72 |
| 2014/0186115 | A1 * | 7/2014 | Graham | E01C 19/4873 404/75 |
| 2014/0202047 | A1 * | 7/2014 | Kawakami | E01H 5/04 37/257 |
| 2015/0107136 | A1 * | 4/2015 | Fukano | E01H 5/098 37/235 |
| 2015/0139729 | A1 | 5/2015 | Graham et al. | |
| 2015/0166274 | A1 * | 6/2015 | Swearingen | B65G 67/02 414/341 |
| 2016/0024725 | A1 * | 1/2016 | Frelich | E01C 19/48 404/72 |
| 2016/0244925 | A1 * | 8/2016 | Yuki | E01H 5/045 |
| 2017/0178428 | A1 * | 6/2017 | Watermann | G07C 5/0825 |

* cited by examiner

SYSTEM AND METHOD FOR CONTROLLING AUGER OF PAVING MACHINE

TECHNICAL FIELD

The present disclosure relates generally to a paving machine with an auger and, more particularly, to a system and a method for controlling the auger.

BACKGROUND

Paving machines are used to apply, spread, and compact a mat of paving material over a paving surface. A paving machine generally includes a tractor and a screed assembly. The tractor has a hopper for receiving asphalt material from a truck and a conveyor system for transferring the asphalt rearwardly from the hopper for discharge onto the paving surface. The paving machine includes augers to spread the asphalt across the paving surface in front of the screed assembly. The screed assembly smoothens and compacts the asphalt material on the paving surface.

The augers are typically located close to a ground surface. Therefore, the augers may sustain damage when the paving machine is travelling over an obstruction or uneven terrain. Such damage to the augers may reduce paving performance of the paving machine and may also render the paving machine inoperable until the augers is replaced.

U.S. Pat. No. 5,752,783 (the '783 reference) relates to a paving apparatus provided with a micropower impulse radar device connected to control a leveller. The leveller is a screed provided with actuators for adjusting screed elevation, slope, and extension. The radar senses a reference, such as a string line, and operates the actuators to adjust the screed. However, the leveller of the '783 reference may not prevent damage to an auger of the paving apparatus due to impact with an obstruction.

SUMMARY OF THE DISCLOSURE

In an aspect of the present disclosure, a paving machine is provided. The paving machine includes a tractor, a screed assembly coupled to the tractor, and an auger coupled to the tractor and disposed between the tractor and the screed assembly. The paving machine also includes an actuator coupled to the auger and the tractor of the paving machine. The actuator is configured to move the auger relative to a ground surface. The paving machine further includes a sensor assembly coupled to the tractor and configured to detect an obstruction. The paving machine also includes a controller in communication with the actuator and the sensor. The controller is configured to receive a signal from the sensor assembly indicative of the obstruction. The controller is further configured to control the actuator to raise the auger above the obstruction.

In another aspect of the present disclosure, a control system for a paving machine travelling on a ground surface is provided. The paving machine includes a tractor, a screed assembly coupled to the tractor, and an auger coupled to the tractor and disposed between the tractor and the screed assembly. The control system includes an actuator coupled to the auger and the tractor of the paving machine. The actuator is configured to move the auger relative to the ground surface. The control system also includes a sensor assembly coupled to the tractor. The sensor is configured to detect an obstruction on the ground surface. The control system further includes a controller in communication with the actuator and the sensor. The controller is configured to receive a signal from the sensor assembly indicative of the obstruction. The controller is further configured to control the actuator to raise the auger above the obstruction.

In yet another aspect of the present disclosure, a method of controlling a paving machine travelling on a ground surface is provided. The paving machine incudes a tractor, a screed assembly coupled to the actuator, a control system, and an auger coupled to the tractor and the control system. The method includes detecting, via the control system, an obstruction on the ground surface. The method also includes determining, via the control system, that the auger will contact the obstruction. The method further includes controlling the actuator to raise the auger above the obstruction.

DETAILED DESCRIPTION

Figure 1:
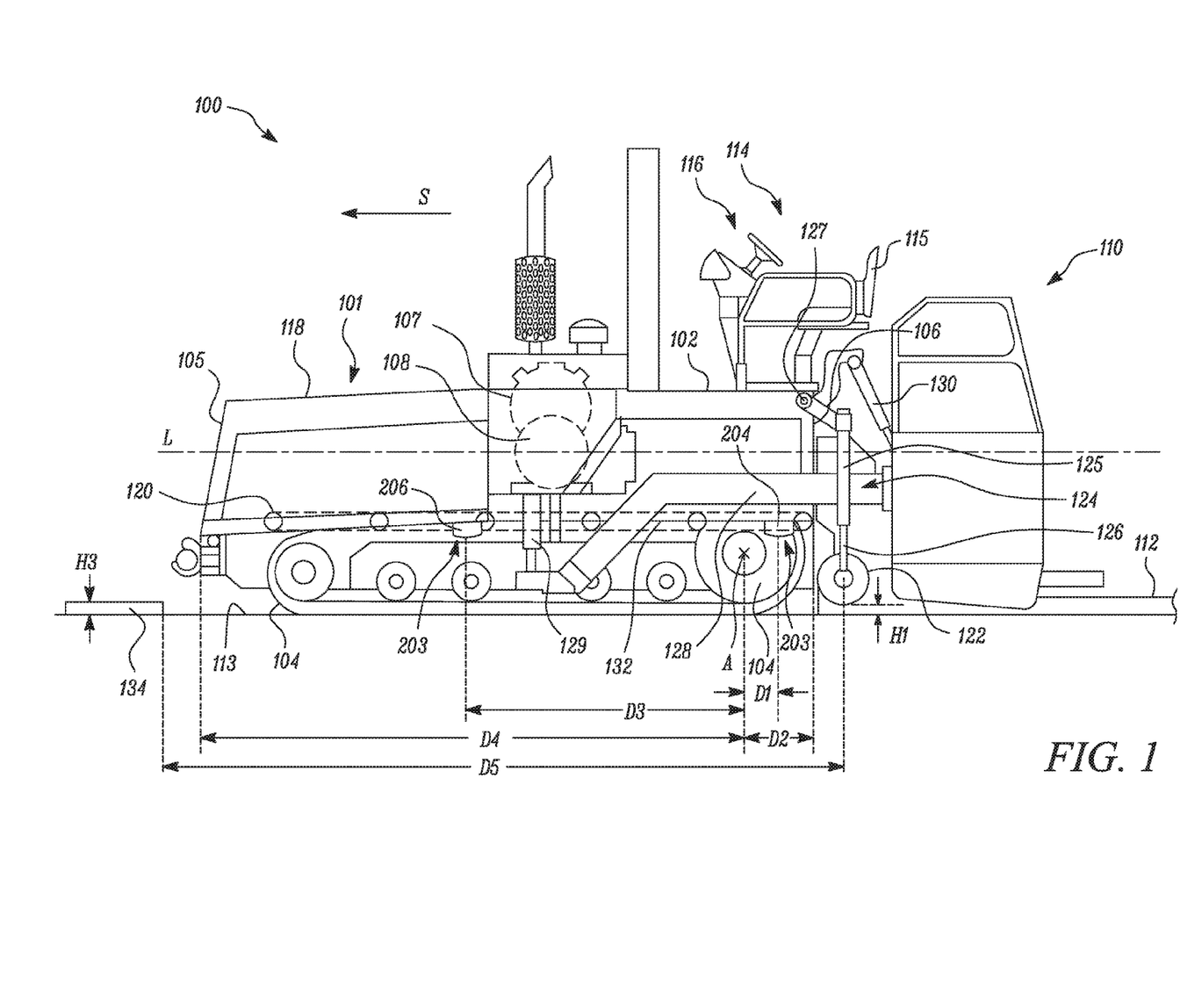
FIG. 1 is a side view of a paving machine having an auger approaching an obstruction, according to an embodiment of the present disclosure.

Wherever possible, the same reference numbers will be used throughout the drawings to refer to the same or the like parts. Referring to FIG. 1, an exemplary paving machine 100 (hereinafter referred to as "the machine 100") is illustrated. The machine 100 includes a tractor 101 having a frame 102 with a set of ground engaging members 104 coupled with the frame 102. Though the ground engaging members 104 are illustrated as tracks in FIG. 1, in various alternative embodiments, the ground engaging members 104 may be wheels. Further, the frame 102 of the tractor 101 defines a longitudinal axis and has a front end 105 and a rear end 106. The ground engaging member 104 located proximal to the rear end 106 of the machine 100 is rotatable about a rear pivot axis 'A'. The rear pivot axis 'A' may be defined by an axle, a planetary gearset, and the like.

The ground engaging members 104 are driven by an engine 107 via a transmission (not shown). The transmission may be a hydrostatic transmission or a mechanical transmission. The engine 107 further drives an associated generator 108 that is used to power various systems on the machine 100. A screed assembly 110 is coupled to the tractor 101 and attached at a rear end 106 of the machine 100 to spread and compact paving material into a layer or mat 112 of desired thickness, size and uniformity on a ground surface 113. In the illustrated embodiment, the ground surface 113 is a base surface on which a paving operation is performed. However, the ground surface 113 may alternatively be a finished or an unfinished ground on which the machine 100 manoeuvres or travels without performing a paving operation. The screed assembly 110 may also be powered by the generator 108. The generator 108 may be used to power multiple components associated with the screed assembly 110, for example, electric heating elements (not shown), crown actuators (not shown) etc. The machine 100 also includes an operator station 114 having a seat 115 and a console 116, which may include various controls for directing operations of the machine 100. The screed assembly 110 may also include an operator console (not shown).

The machine 100 further includes a hopper 118 configured to store a paving material, and a conveyor system including one or more conveyors 120 configured to move the paving material from the hopper 118 to the rear end 106 of the frame 102. The conveyors 120 are arranged at a bottom of the hopper 118 and, if more than one is provided, may be positioned side-by-side and run parallel to one another to the rear end 106 of the frame 102. The speed of the one or more conveyors 120 is adjustable in order to control the rate at which paving material may be delivered to the screed assembly 110. In case more than one conveyor 120 is provided, the speed of each of the conveyors 120 may be independently variable in order to adjust the amount of paving material delivered to each side of the screed assembly 110. While an endless path conveyor is shown, one or more feed augers or other material feed components may be used instead of or in addition to the conveyors 120.

The machine 100 includes an auger 122 coupled to the tractor 101 and located between the tractor 101 and the screed assembly 110. Specifically, the auger 122 is placed at the rear end 106 of the frame 102 and adjacent to the screed assembly 110. The auger 122 is configured to receive the paving material supplied by the conveyors 120 and spread the material evenly ahead of the screed assembly 110. In an embodiment, the auger 122 may be a screw auger. Although only one auger 122 is shown in FIG. 1, the machine 100 may have a single auger or any number of augers. If the machine 100 includes multiple augers 122, the augers 122 may be aligned adjacent to one another. In case multiple augers 122 are provided, each auger 122 may be independently controlled in order to control an amount of the paving material in front of a left side and/or a right side of the screed assembly 110. For the purposes of this disclosure, multiple augers are collectively referred to as the auger 122.

A control system 200 (shown in FIG. 2) controls various parameters of the auger 122, for example, raising or lowering of the auger 122 relative to the ground surface 113 and a speed of rotation of the auger 122. The control system 200 includes an actuator 124 to move the auger 122 relative to the ground surface 113. In the illustrated embodiment, the actuator 124 is shown as hydraulic cylinder coupled to the auger 122 and the tractor 101. However, in various alternative embodiments, the actuator 124 may be motor driven linear actuator. Though one actuator 124 is illustrated in FIG. 1, multiple actuators 124 may be provided for the auger 122. In case there are multiple augers 122, each auger 122 may be provided with one or more actuators 124. The actuator 124 includes a casing 125 coupled to the frame 102 and a rod 126 connected to the auger 122. However, in an alternative embodiment, the casing 125 may be coupled to the auger 122 and the rod 126 may be coupled to the frame 102. In a further embodiment, the actuator 124 may be operatively coupled to the frame 102 and/or the auger 122 via one or more intermediate elements (for example, links). The rod 126 extends or retracts with respect to the casing 125 to move the auger 122 relative to the ground surface 113. In the illustrated embodiment, the casing 125 is connected to the frame 102 via a pivot joint 127. Alternatively, the casing 125 may be fixedly coupled to the frame 102 or connected to the frame 102 by any other type of joint, for example, a universal joint. The actuator 124 may be a single acting or a double acting cylinder. Further, the actuator 124 may include one or more sensing elements (not shown) configured to sense an extent of retraction or extension of the rod 126, to determine a height of the auger 122, the distance between the auger 122 and the ground surface 113.

The height of the auger 122 may be adjusted in order to position the auger 122 at an operating height 'H' to sufficiently spread the paving material. For example, if the height of the auger 122 is too high, the paving material may not be sufficiently spread and the screed assembly 110 may not be able to smooth it out completely. On the other hand, if the height of the auger 122 is too low, it may disrupt the paving material such that there may not be enough material for the screed assembly 110 to smooth and compact. In the illustrated embodiment, the auger 122 is located at an operating height 'H1' relative to the ground surface 113 to carry out the spreading operation of the paving material.

As shown in FIG. 1, the screed assembly 110 is connected behind the machine 100 by a pair of tow arms 128 (only one of which is visible in FIG. 1) that extend between the frame 102 of the machine 100 and the screed assembly 110. The tow arms 128 are pivotally connected to the frame 102 such that the relative position and orientation of the screed assembly 110 relative to the frame 102, and the ground surface 113, may be adjusted by pivoting the tow arms 128 in order, for example, to control the thickness of paving material deposited on the ground surface 113. The machine 100 includes tow arm actuators 129 that are configured to raise and lower the tow arms 128 and thereby raise and lower the screed assembly 110. The tow arm actuators 129 may be any suitable actuators, such as hydraulic actuators. Screed lift cylinders 130 are also provided to allow further adjustment of a height of the screed assembly 110 relative to the ground surface 113. The screed assembly 110 may be any of a number of configurations known in the art such as a fixed width screed, a rear mount extendable screed, a front mount extendable screed, or a multiple section screed that includes extensions. In an embodiment, the screed assembly 110 may be a multiple section screed including a main screed section (not shown) and extender screed sections (not shown) located on both sides of the main screed section. The extender screed sections may be individually adjustable with respect to the main screed section to allow for varying widths and crowning of the ground surface 113.

In an embodiment, the actuator 124, the tow arm actuators 129 and the screed lift cylinders 130 may be actuated by a hydraulic system (not shown) of the machine 100. The hydraulic system may include one or more valves, hydraulic pumps, fluid conduits, tanks, and the like, to regulate the actuator 124, the tow arm actuators 129 and the screed lift cylinders 130. Further, the control system 200 may be configured to control various components of the hydraulic system. In various alternative embodiments, the actuator 124, the tow arm actuators 129 and/or the screed lift cylinders 130 may be any other type of linear actuators, for example, electrically driven worm drives. The control system 200 will be hereinafter described in greater detail with reference to FIGS. 1 and 2.

Figure 2:
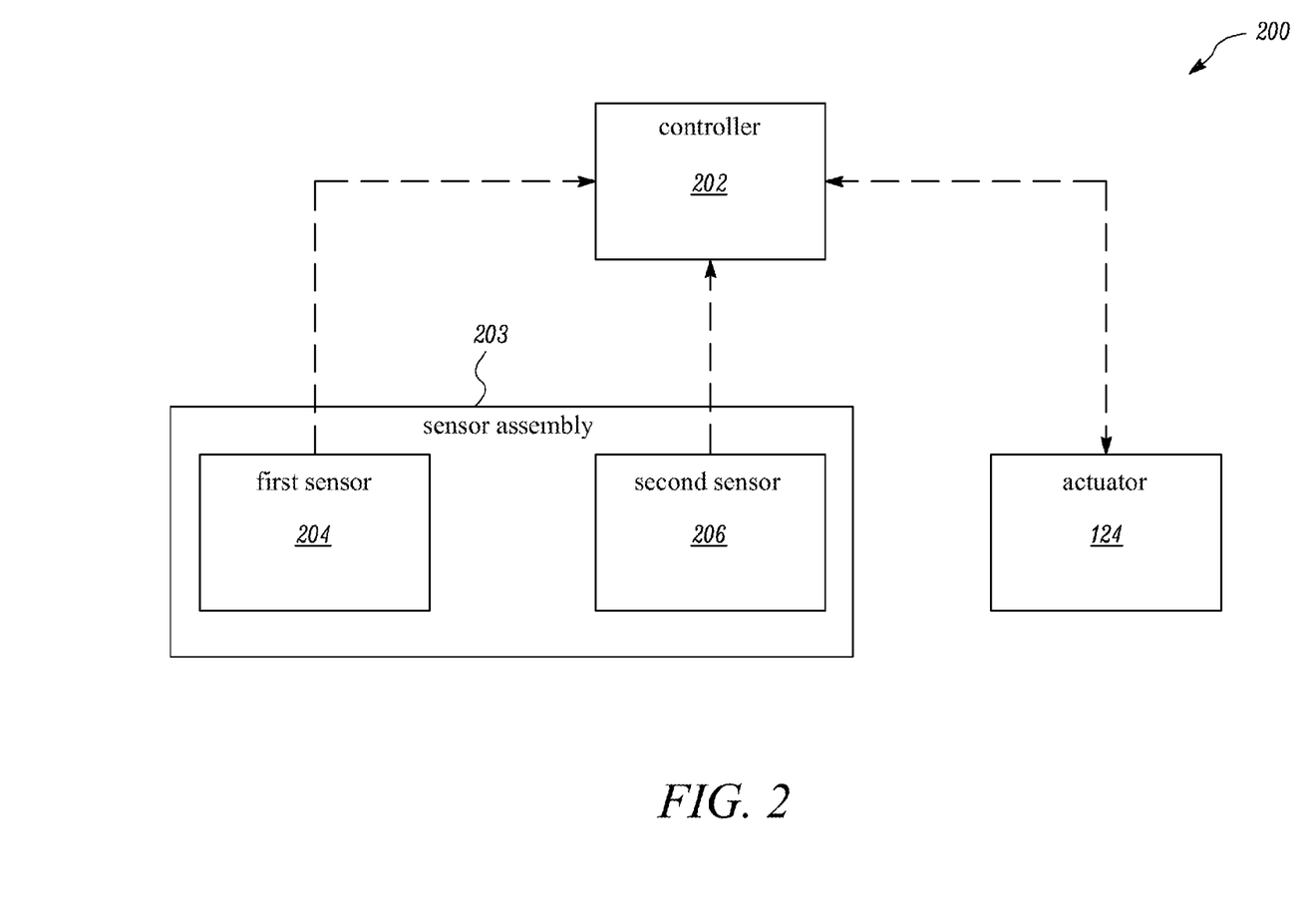
FIG. 2 is a block diagram of a control system of the paving machine, according to an embodiment of the present disclosure.

FIG. 2 illustrates the control system 200 configured to control various systems and components associated with the machine 100. The control system 200 includes a controller 202, a sensor assembly 203 and the actuator 124. In one embodiment, the sensor assembly 203 includes a first sensor 204 and a second sensor 206. The controller 202 may include a microprocessor, an application specific integrated circuit ("ASIC"), or other appropriate circuitry and may have memory or other data storage capabilities. The controller 202 may include functions, steps, routines, data tables, data maps, charts and the like saved in and executable from read only memory to control the machine 100. Although in FIG. 2, the controller 202 is illustrated as a single, discrete unit, in other embodiments the controller 202 and its functions may be distributed among multiple distinct and separate components. Further, in addition to the components illustrated in FIG. 2, the controller 202 may be operatively associated with various other components of the machine 100, such as the tow arm actuators 129 and the screed lift cylinders 130. Communication between the controller 202 and the other electrical components may be established by sending and receiving digital or analog signals across electronic communication lines or communication busses, including by wireless communication. In FIG. 2, the various communication and command channels are indicated in dashed lines for illustration purposes.

Referring to FIGS. 1 and 2, the sensor assembly 203 is arranged on the machine 100 such that the sensor assembly 203 is able to detect obstructions on the ground surface 113. Specifically, the first and second sensors 204, 206 of the sensor assembly 203 are disposed on a surface, for example, a bottom surface 132 of the frame 102 of the tractor 101, such that the first and second sensors 204, 206 face the ground surface 113. In an embodiment, the first and second sensors 204, 206 may be proximity sensors configured to detect an obstruction on the ground surface 113. Though the first and second sensors 204, 206 are illustrated as being mounted on the bottom surface 132 of the frame 102, the first and second sensors 204, 206 may be provided at any alternative location on the machine 100 to enable detection of the obstruction. Each of the first and second sensors 204, 206 may be a capacitive sensor, an inductive sensor, a magnetic sensor, an optical sensor, an ultrasound sensor, a radiowave sensor or any other suitable type of sensor. Further, each of the first and second sensors 204, 206 may be encased inside a housing (not shown) to protect internal components from particulate matter and moisture. The controller 202 is communicably coupled to and configured to receive signals from the first and second sensors 204, 206. In an embodiment, the first and second sensors 204, 206 may also be able to detect a characteristic indicative of a height of the obstruction. The controller 202 may be able to determine the height of the obstruction based on signals received from the first and/or second sensors 204, 206. In case the obstruction is uneven and has a variable height, the controller 202 may determine the maximum height of the obstruction based on signals received from the first and second sensors 204, 206.

The first sensor 204 is disposed on the frame 102 at a longitudinal location between the auger 122 and the rear pivot axis 'A'. A distance 'D1' between the rear pivot axis 'A' and the first sensor 204 may depend based on various factors, such as a distance 'D2' between the rear pivot axis 'A' and the rear end 106 of the frame 102, and dimensions of the first sensor 204. The second sensor 206 is spaced apart from the first sensor 204 and located between the rear pivot axis 'A' and the front end 105 of the frame 102. A distance 'D3' between the rear pivot axis 'A' and the second sensor 206 may depend on various factors, such as a distance 'D4' between the rear pivot axis 'A' and the front end 105 of the frame 102, and dimensions of the second sensor 206. Though only the first and second sensors 204, 206 are illustrated in FIG. 2, it may be possible that the sensor assembly 203 comprises multiple such sensors which may be spaced apart from each of the first and second sensors 204, 206 across a width of the frame 102.

During the paving operation, the machine 100 travels along a travel direction 'S' and deposits the paving material onto the ground surface 113. Further, the actuator 124 positions the auger 122 at the operating height 'H1' relative to the ground surface 113. The operating height 'H1' maybe automatically set by the controller 202 or manually selected by an operator of the machine 100. The controller 202 controls the actuator 124 to retain the auger 122 at the operating height 'H1'. The controller 202 may control the actuator 124 via one or more electrically controlled valves that regulate flow of actuating fluid to and from the actuator 124. In an embodiment, the controller 202 also detects and stores the operating height 'H1' of the auger 122 based on signals received from various sensing elements (not shown) included in the actuator 124. However, in various alternative embodiments, the controller 202 may determine the operating height based on signals received from other components, for example, a separate sensor (not shown) configured to measure the height of the auger 122, a position of a lever (not shown) used to manually change the height of the auger 122, operating condition of the one or more electronically controlled valves that regulate flow to and from the actuator 124 etc.

Further, the obstruction on the ground surface 113 is illustrated as a manhole cover 134. However, the obstruction may be any other object, a slope 302 (illustrated in FIG. 5), or an undulation on the ground surface 113. Such obstructions may impact the auger 122 located at the operating height 'H1'. In an embodiment, the controller 202 may detect the paving operation of the machine 100 and receive signals from the sensor assembly 203 indicative of the obstruction on the ground surface 113 forward of the auger 122 along the travel direction 'S'. In an embodiment, the controller 202 detects the manhole cover 134 based on signals received from the second sensor 206. In an embodiment, the controller 202 may also receive signals from the first sensor 204 and compare readings of the first and second sensors 204, 206 to eliminate any false readings and detect any malfunction of the first and/or second sensors 204, 206. In a further embodiment, the controller 202 may receive signals from the first sensor 204 in order to detect the obstruction during the paving operation.

Figure 3:
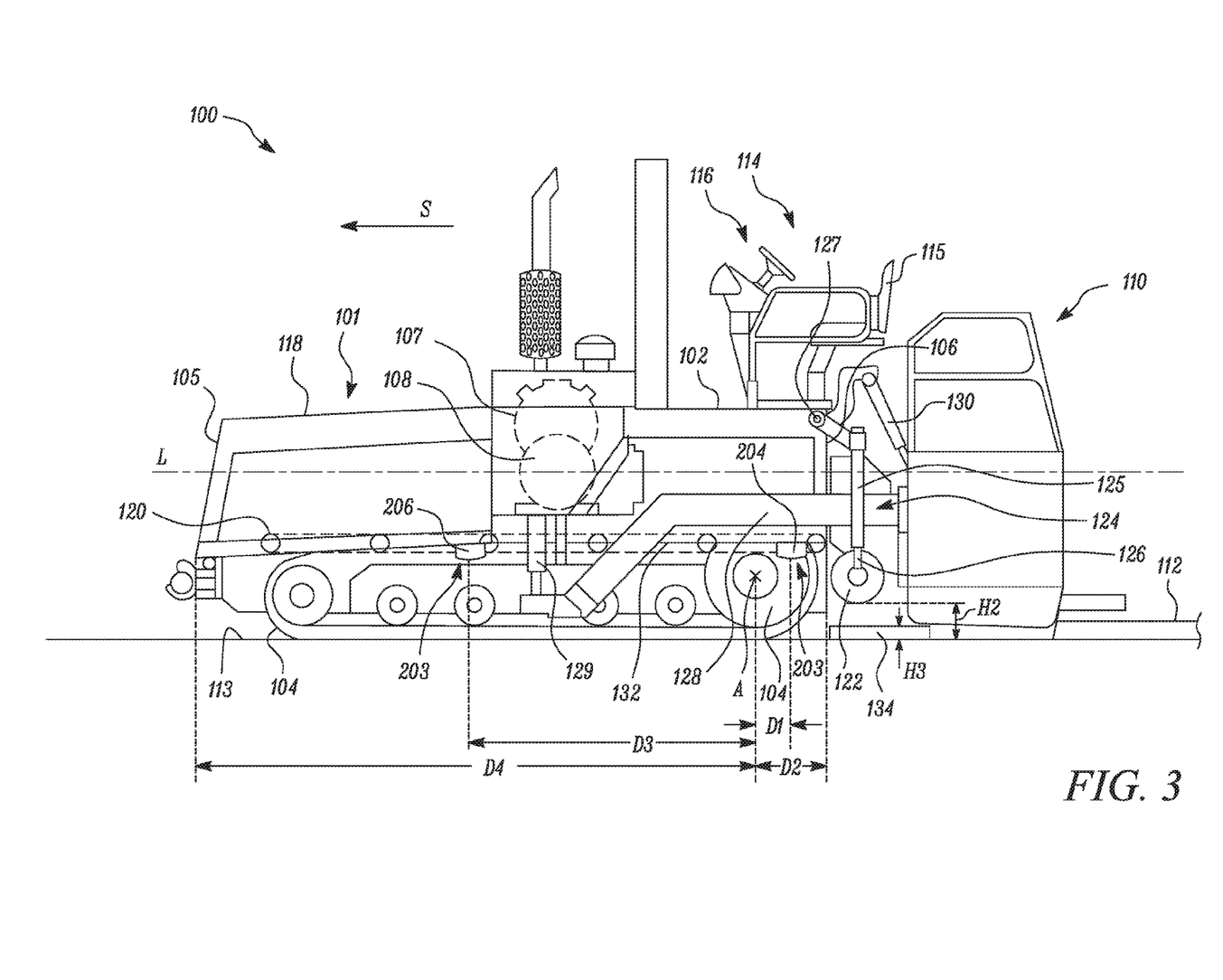
FIG. 3 is a side view of the paving machine of FIG. 1 with the auger in a raised position and travelling over the obstruction.

Referring to FIGS. 1 to 3, when the controller 202 detects the manhole cover 134 based on signals received from the sensor assembly 103, the controller 202 regulates the actuator 124 to raise the auger 122 relative to the ground surface 113. In an embodiment, the controller 202 may determine a height 'H3' of the manhole cover 134 based on signals received from the sensor assembly 203, and compares the operating height "H1" of the auger 122 with the height 'H3' of the manhole cover 134. The controller 202 further raises the auger 122 from the operating height "H1" to a height 'H2' such that the height 'H2' is greater than the obstruction height 'H3'.

In an embodiment, the controller 202 may also determine an obstruction distance 'D5', the distance between the auger 122 and the obstruction, in the illustrated embodiment manhole cover 134. In an embodiment, the controller 202 may determine the obstruction distance 'D5' based on signals received from the first sensor 204 and/or the second sensor 206. The controller 202 may further compare the obstruction distance 'D5' to a predetermined distance. The predetermined distance may be stored in the memory of the controller 202, and is indicative of the distance when the controller 202 may initiate raising the auger 122 above the operating height 'H1'. The predetermined distance may be calculated based on an efficiency parameter of the paving operation, so that the controller 202 does not raise the auger 122 prematurely, and also not later than the point of time, when the auger 122 may hit the obstruction. The controller 202 raises the auger 122 to the height 'H2', which is greater the obstruction height 'H3', when the obstruction distance 'D5' is equal to the predetermined distance. Thus, the duration during which the auger 122 is retained at the height 'H2' is optimized to safely prevent contact between the manhole cover 134 and the auger 122, without impacting a quality of the mat 112 deposited on the ground surface 113.

Figure 4:
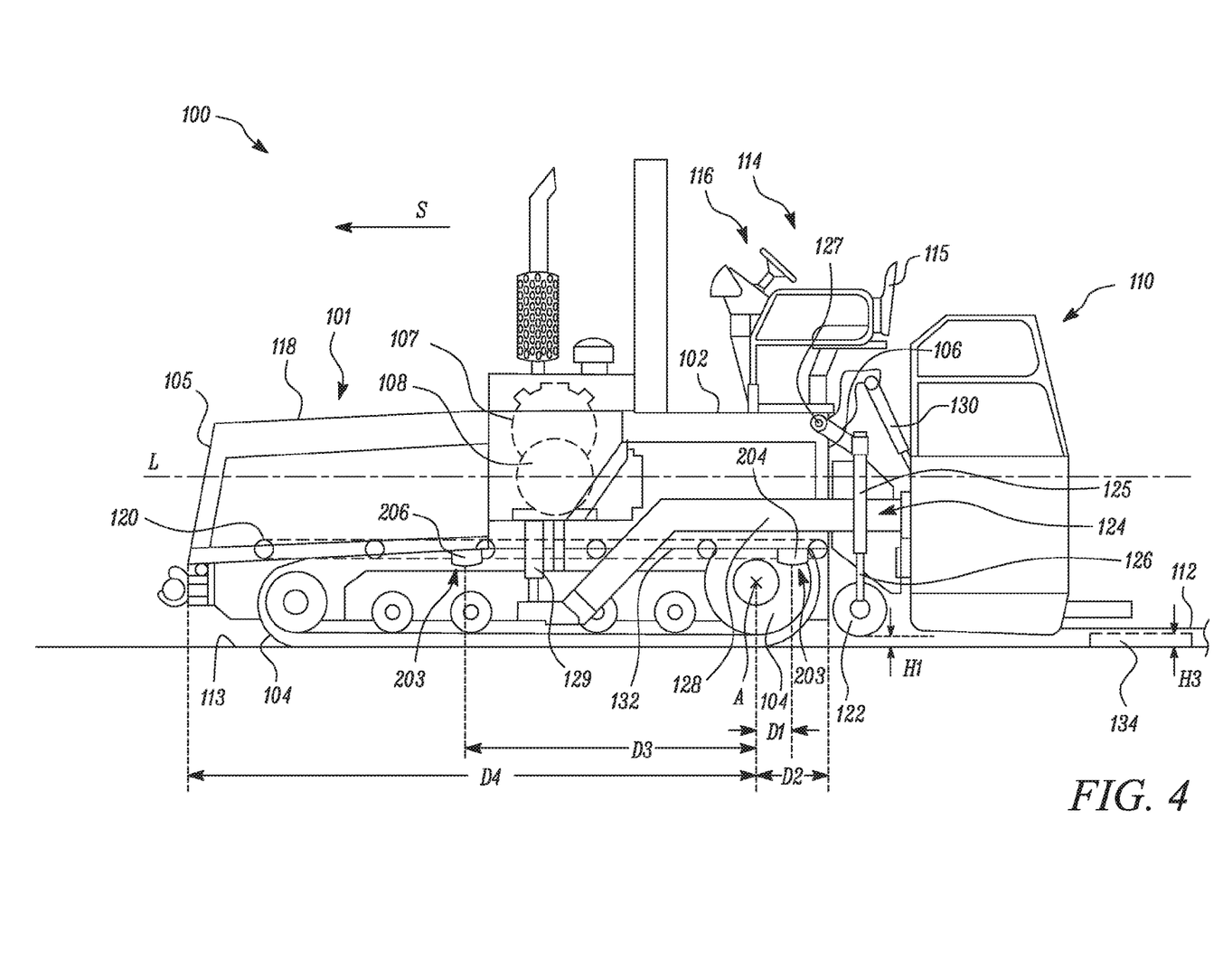
FIG. 4 is a side view of the paving machine of FIG. 1 with the auger in a lowered position after passing the obstruction.

Referring to FIG. 4, the controller 202 may lower the auger 122 to the operating height 'H' suitable for the paving operation, after the auger 122 or the machine 100 travels over the manhole cover 134. In an embodiment, the controller 202 may receive signals from the first sensor 204 or the second sensor 206, and determine that the first sensor 204 or the second sensor 206 has passed over the manhole cover 134. Subsequently, the controller 202 may determine that the auger 122 has passed over the manhole cover 134 based on a travelling speed of the machine 100. The controller 202 may then lower the auger 122 to the operating height thereby minimizing the duration during which the auger 122 is raised.

Figure 5:
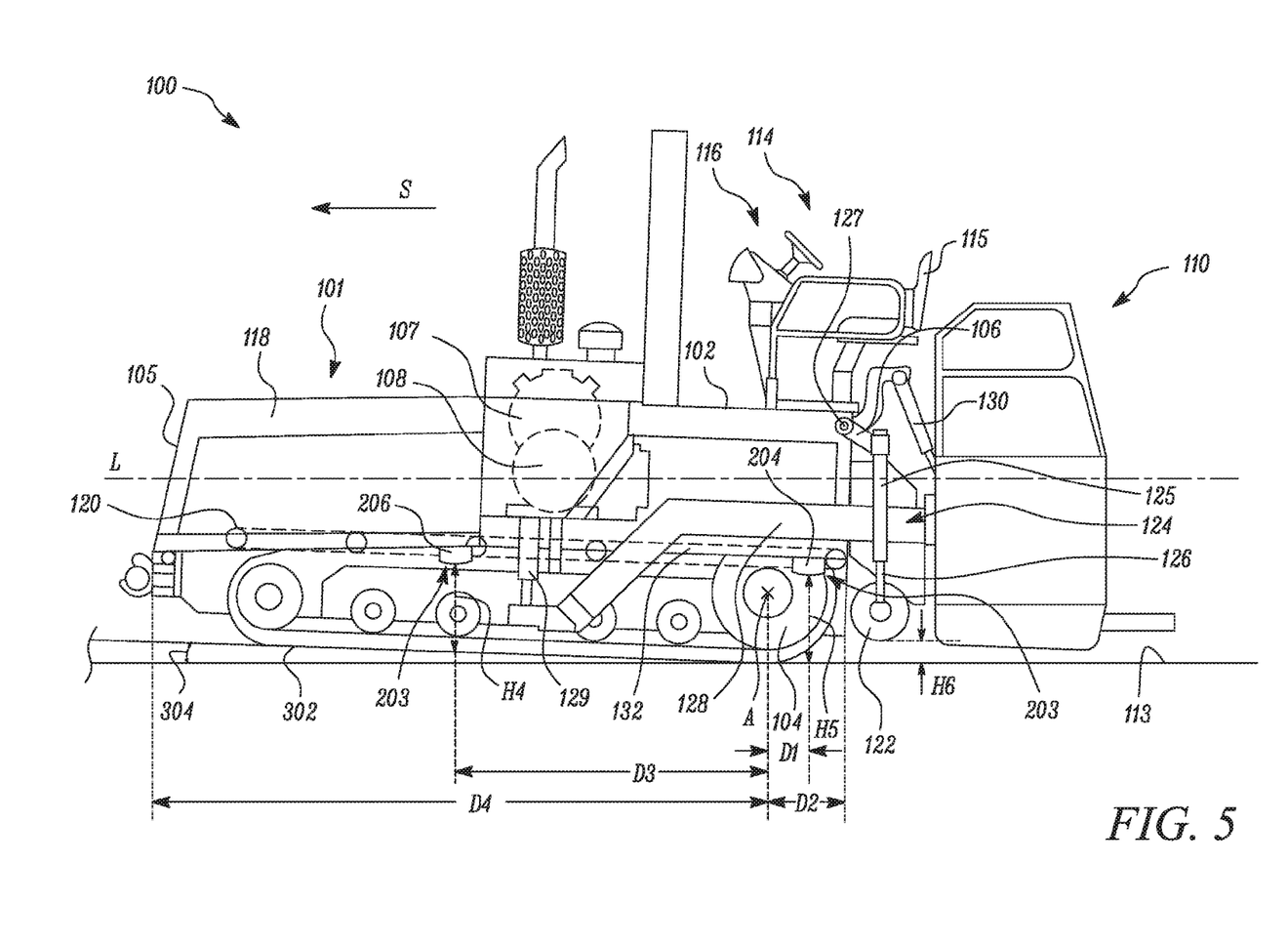
FIG. 5 is a side view of the paving machine of FIG. 1 travelling up a slope.

FIG. 5 illustrates the machine 100 travelling over the slope 302 located on the ground surface 113. The slope 302 may be a ramp that the machine 100 has to traverse during a manoeuvring operation. The ground engaging members 104 proximal to the front end 105 of the frame 102 first travel over the slope 302 when the machine 100 is travelling along the travel direction 'S'. Based on an angle of inclination 304 of the slope 302, the frame 102 pivots about the rear pivot axis 'A'. Consequently, the second sensor 206 may detect an increase in height with respect to the slope 302. As shown in FIG. 5, the second sensor 206 detects a height 'H4'. However, the first sensor 204 detects a dipping of the frame 102 at the rear end 106 as the frame 102 pivots about the rear pivot axis 'A'. Hence, the first sensor 204 detects a decrease in height with respect to the ground surface 113 as illustrated by a height Based on a difference between the height 'H5' detected by the first sensor 204 and the height 'H4' detected by the second sensor 206, the controller 202 may determine an angle of dipping 303 of the frame 102. Further, based on the angle of dipping 303 of the frame 102 and the operating height 'H1' (shown in FIG. 1) of the auger 122 relative to the ground surface 113, the controller 202 may determine if the auger 122 needs to be raised. If required, the controller 202 may raise the auger 122 to a height 'H6' to prevent contact between the auger 122 and the slope 302. After the machine 100 has travelled over the slope 302 and is substantially horizontal on the ground surface 113, the controller 202 may lower the auger 122 to the operating height 'H1' (shown in FIG. 1), based on signals received from the first sensor 204 and/or the second sensor 206. Alternatively, the controller 202 may lower the auger 122 to the operating height 'H1' once the machine 100 is entirely located on the slope 302. The controller 202 may determine that the machine 100 is entirely located on the slope 302 when the first and the second sensors 204, 206 detect substantially equal heights indicating that the frame 102 is generally parallel to the slope 302. The controller 202 may similarly utilize the first sensor 204 when the machine 100 has to travel over undulations which may cause dipping of the frame 102.

INDUSTRIAL APPLICABILITY

During various operations performed by a paving machine on a ground surface having obstructions, one or more augers may collide with the obstruction and sustain damage. Such damage to the auger(s) may reduce a paving performance of the paving machine and may also render the paving machine inoperable until the auger(s) is replaced.

The present disclosure is related to the paving machine 100 including the control system 200. The control system 200 detects an obstruction on the ground surface 113 and automatically moves the auger 122 from the operating height to prevent contact between the obstruction and the auger 122, thereby protecting the auger 122 against any damage. Once the auger 122 has cleared the obstruction the control system 200 may lower the auger 122 to the operating height such that a paving operation of the paving machine 100 is not affected.

The control system 200 of the present disclosure may therefore automatically prevent damage to the auger 122 during various operations of the machine 100. Thus, paving performance of the machine 100 may not be affected due to any damage to the auger 122. Downtimes, required for replacement of the auger 122, may also be avoided. Further, the auger 122 is automatically moved to the initial height by the control system 200 and the method 400 after the machine 100 has passed over the obstruction. Since the initial height may be suitable for a paving operation, quality of the paving operation may not be affected due to raising of the auger 122.

While aspects of the present disclosure have been particularly shown and described with reference to the embodiments above, it will be understood by those skilled in the art that various additional embodiments may be contemplated by the modification of the disclosed systems and methods without departing from the spirit and scope of what is disclosed. Such embodiments should be understood to fall within the scope of the present disclosure as determined based upon the claims and any equivalents thereof.

What is claimed is:

1. A paving machine comprising:
   a tractor;
   a screed assembly coupled to the tractor;
   an auger coupled to the tractor and disposed between the tractor and the screed assembly;
   an actuator coupled to the auger and the tractor, the actuator configured to move the auger relative to a ground surface;
   a sensor assembly coupled to the tractor and configured to detect an obstruction; and a controller in communication with the actuator and the sensor assembly, the controller including a memory storing instructions, and a processor operatively connected to the memory that executes the instructions, the controller configured to:
   receive a signal from the sensor assembly indicative of the obstruction;
   control the actuator to raise the auger above the obstruction determine an auger height which is representative of the distance between the auger and the ground surface;
   determine an obstruction distance which is representative of the distance of the obstruction forward of the auger along the ground surface in a travel direction of the paving machine;
   compare the obstruction distance to a predetermined distance;
   determine an obstruction height from the sensor assembly;
   compare the auger height to the obstruction height; and raise the auger from an operating height to an auger height that is greater than the obstruction height when the obstruction distance is equal to the predetermined distance.

2. The paving machine of claim 1, wherein the controller is further configured to:
   determine that the auger is past the obstruction; and
   lower the auger to the operating height when the auger is past the obstruction.

3. The paving machine of claim 1, wherein the paving machine further comprises a ground engaging member coupled to the tractor and rotatable about a rear pivot axis, and wherein the sensor assembly comprises a first sensor disposed between the rear pivot axis and the auger.

4. The paving machine of claim 3, wherein the sensor assembly further comprises a second sensor disposed between the rear pivot axis and a front end of the tractor.

5. A control system for a paving machine comprising:
   an actuator coupled to an auger and a tractor, the actuator configured to move the auger relative to a ground surface;
   a sensor assembly coupled to the tractor and configured to detect an obstruction; and
   a controller in communication with the actuator and the sensor assembly, the controller including a memory storing instructions, and a processor operatively connected to the memory that executes the instructions, the controller configured to:
      receive a signal from the sensor assembly indicative of the obstruction;
      determine an auger height which is representative of the distance between the auger and the ground surface;
      determine an obstruction height from the sensor assembly;
      compare the auger height to the obstruction height;
      raise the auger from an operating height to an auger height that is greater than the obstruction height;
      determine an obstruction distance which is representative of the distance of the auger from the obstruction;
      compare the obstruction distance to a predetermined distance; and
      raise the auger when the obstruction distance is equal to the predetermined distance.

6. The control system of claim 5, wherein the controller is further configured to:
   determine that the auger is past the obstruction; and
   lower the auger to the operating height when the auger is past the obstruction.

7. The control system of claim 5, wherein the sensor assembly comprises a first sensor disposed between a rear pivot axis, about which a ground engaging member of the tractor is rotatable, and the auger.

8. The control system of claim 7, wherein the sensor assembly further comprises a second sensor disposed between the rear pivot axis and a front end of the tractor.

9. A method of controlling a paving machine having an auger and a sensor assembly, comprising:
   detecting, with the sensor assembly, an obstruction on a ground surface;
   determining that an auger will contact the obstruction; and
   controlling an actuator to raise the auger above the obstruction determining, with the sensor assembly, an auger height which is representative of the distance between the auger and the ground surface;
   determining, with the sensor assembly, an obstruction distance which is representative of the distance of the obstruction forward of the auger along the ground surface in a travel direction of the paving machine;
   comparing the obstruction distance to a predetermined distance;
   determining, with the sensor assembly, an obstruction height;
   automatically comparing the auger height to the obstruction height; and
   automatically raising the auger from an operating height to an auger height that is greater than the obstruction height when the obstruction distance is equal to the predetermined distance.

10. The method of claim 9, further comprising:
   determining, with the sensor assembly, the auger is past the obstruction; and
   automatically lowering the auger to the operating height when the auger is past the obstruction.

11. The method of claim 9, further including initiating the raising of the auger based on the obstruction distance.

* * * * *